US012637954B2

(12) United States Patent
Davis

(10) Patent No.: US 12,637,954 B2

(45) Date of Patent: May 26, 2026

(54) SEAL ASSEMBLY FOR GAS TURBINE ENGINES

(71) Applicant: RTX CORPORATION, Farmington, CT (US)

(72) Inventor: Todd A. Davis, Tolland, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 19/308,538

(22) Filed: Aug. 25, 2025

(65) Prior Publication Data

US 2026/0015948 A1 Jan. 15, 2026

Related U.S. Application Data

(63) Continuation of application No. 18/772,386, filed on Jul. 15, 2024, now Pat. No. 12,480,418.

(51) Int. Cl.

*F01D 11/00* (2006.01)
*F01D 25/18* (2006.01)

(52) U.S. Cl.

CPC .......... *F01D 11/005* (2013.01); *F01D 11/003* (2013.01); *F01D 25/183* (2013.01); *F05D 2220/32* (2013.01); *F05D 2240/55* (2013.01)

(58) Field of Classification Search

CPC .... F01D 11/005; F01D 11/003; F01D 25/183; F05D 2220/32; F05D 2240/55

See application file for complete search history.

(56) References Cited

U.S. PATENT DOCUMENTS

| | | | | |
|---|---|---|---|---|
| 4,406,466 A * | 9/1983 | Geary, Jr. | F16J 15/3412 | 277/400 |
| 4,687,346 A * | 8/1987 | Suciu | F16J 15/3464 | 415/113 |
| 6,142,729 A * | 11/2000 | Tran | F16J 15/3464 | 415/113 |
| 10,619,500 B2 | 4/2020 | Maret et al. | | |
| 10,718,234 B2 | 7/2020 | Witlicki | | |
| 11,946,548 B2 | 4/2024 | Sonokawa et al. | | |

(Continued)

FOREIGN PATENT DOCUMENTS

| | | |
|---|---|---|
| EP | 3438417 A1 | 2/2019 |
| EP | 3693555 A1 | 8/2020 |

(Continued)

OTHER PUBLICATIONS

European Search Report for European Patent Application No. 25187960.7 mailed Dec. 19, 2025.

*Primary Examiner* — Andrew J Marien

(74) *Attorney, Agent, or Firm* — Carlson, Gaskey & Olds, P.C.

(57) ABSTRACT

A seal assembly for a gas turbine engine may include a seal carrier extending about an assembly axis. A contacting-type seal member may be secured along the seal carrier. At least one spring carrier may extend from the seal carrier. At least one spring member may be received in a spring pocket of the respective at least one spring carrier. The at least one spring member may be arranged to bias a seal face of the seal member against a seal land at an interface. The at least one spring carrier may extend past the seal face relative to the assembly axis. A method of sealing for a gas turbine engine is also disclosed.

20 Claims, 5 Drawing Sheets

(56) References Cited

U.S. PATENT DOCUMENTS

| | | | | |
|---|---|---|---|---|
| 2013/0075976 | A1* | 3/2013 | Davis | F01D 25/183 277/306 |
| 2017/0335971 | A1* | 11/2017 | Barger | F01D 11/003 |
| 2018/0195415 | A1* | 7/2018 | Witlicki | F16J 15/3472 |
| 2019/0040957 | A1* | 2/2019 | Miller | F16J 15/3452 |

FOREIGN PATENT DOCUMENTS

| | | | |
|---|---|---|---|
| EP | 3913263 | A1 | 11/2021 |
| EP | 4105523 | A1 | 12/2022 |

* cited by examiner

SEAL ASSEMBLY FOR GAS TURBINE ENGINES

CROSS-REFERENCE TO RELATED APPLICATIONS

This disclosure is a continuation of U.S. application Ser. No. 18/772,386 filed Jul. 15, 2024, which is incorporated herein by reference in its entirety.

BACKGROUND

This application relates to sealing for a gas turbine engine, including seal assemblies that seal against portions of the engine.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Bearing compartments typically receive fluid for cooling and lubricating one or more bearings. The bearing compartment may include one or more seals that fluidly separate the bearing compartment from an adjacent portion of the engine.

SUMMARY

A seal assembly for a gas turbine engine may include an annular seal carrier extending about an assembly axis. An annular contacting-type seal member may be secured along a shelf of the seal carrier. At least one spring carrier may extend from the seal carrier. At least one spring member may be received in a spring pocket of the respective at least one spring carrier. The at least one spring member may be arranged to bias an annular seal face of the seal member against a seal land at an interface. The at least one spring carrier may extend past the seal face relative to the assembly axis.

In any implementations, the at least one spring carrier may include a plurality of spring carriers distributed about the assembly axis. The at least one spring member may include a plurality of spring members received in the spring pockets of the respective spring carriers.

In any implementations, the spring carriers may be radially outward of the seal member relative to the assembly axis.

In any implementations, the spring pockets may be dimensioned such that the spring members extend past the seal face relative to the assembly axis.

In any implementations, the seal member may be non-metallic.

In any implementations, the seal member may be a carbon seal.

In any implementations, the at least one spring carrier and the respective spring pocket may be cylindrical.

In any implementations, the at least one spring member may be a coil spring.

In any implementations, an annular support may be securable to the seal carrier. The support may extend about the assembly axis. The at least one spring member may be captured between the respective at least one spring carrier and a spring land of the support such that the spring carrier may be biased away from the support.

In any implementations, a maximum distance between the seal face and the spring land in an assembled configuration may establish a first length relative to the assembly axis. A maximum distance between a floor of the spring pocket and the spring land in the assembled configuration may establish a second length. The second length may be at least 95 percent of the first length.

In any implementations, the seal land may be associated with a bearing compartment.

A gas turbine engine may include a compressor section including a compressor, a turbine section including a turbine that drives the compressor and a seal assembly. The seal assembly may include a seal carrier secured to a support. At least one spring carrier may extend from the seal carrier along an engine axis. A seal member may be secured to the seal carrier. At least one spring member may be received in a spring pocket of the respective at least one spring carrier and may be seated against the support. The at least one spring member may be arranged to bias the seal member against a seal land at an interface such that the at least one spring carrier may extend past the interface relative to the engine axis.

In any implementations, the seal member may be an annular carbon seal extending about the engine axis.

In any implementations, a bearing assembly may include at least one bearing in a bearing compartment and a rotatable member establishing the seal land.

In any implementations, the support may be mechanically attached to a static structure of the engine.

In any implementations, the at least one spring carrier may include a plurality of spring carriers distributed about the engine axis. The at least one spring member may include a plurality of spring members received in the spring pockets of the respective spring carriers.

A method of sealing for a gas turbine engine may include securing a seal carrier to a support such that one or more spring members may be captured in respective pockets of one or more spring carriers that extend from the seal carrier. The method may include securing a contacting-type seal member to the seal carrier. The method may include biasing the seal member against a rotatable seal land at an interface such that the one or more spring carriers may extend past the interface relative to an engine axis.

In any implementations, the seal member may comprise a carbon material.

In any implementations, the interface may be established along a bearing compartment. The bearing compartment may include at least one bearing that supports a rotatable shaft.

In any implementations, a maximum distance between the interface and the spring land in an assembled configuration may establish a first length relative to the engine axis. A maximum distance between a floor of the respective spring pocket and a spring land of the support in the assembled configuration may establish a second length relative to the engine axis. The second length may be at least 95 percent of the first length.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
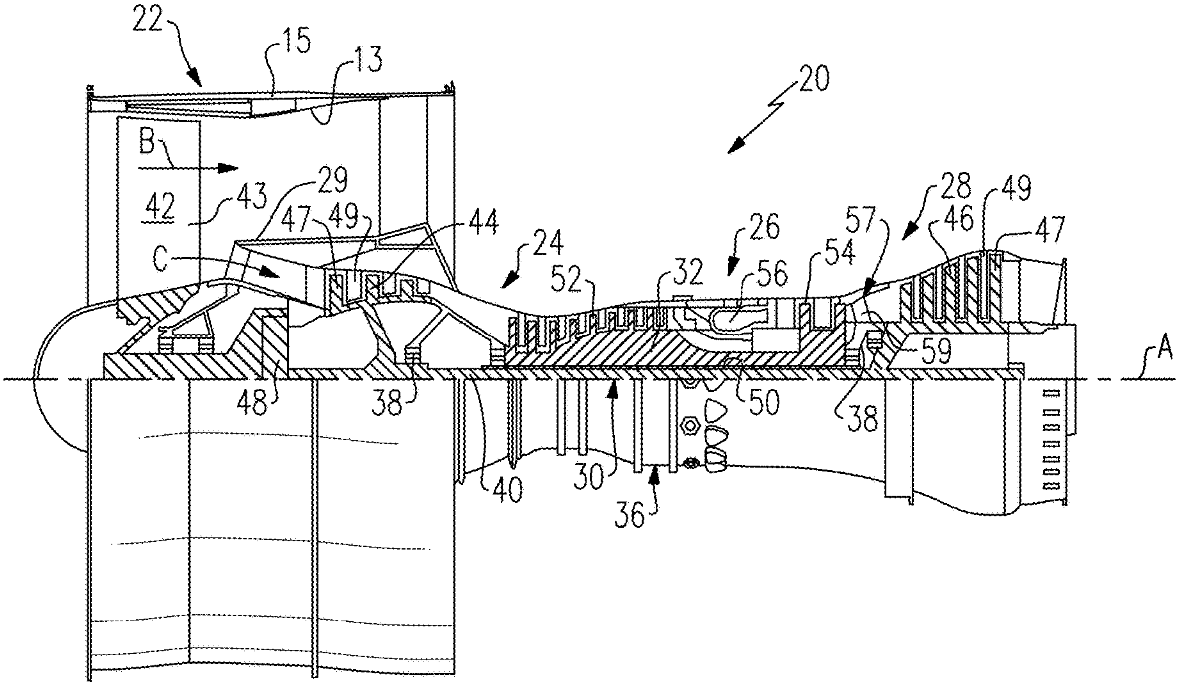
FIG. 1 discloses a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as “bucket cruise Thrust Specific Fuel Consumption (‘TSFC’)”—is the industry standard parameter of lbm of fuel being burned divided by lbf of thrust the engine produces at that minimum point. The engine parameters described above, and those in the next paragraph are measured at this condition unless otherwise specified.

“Fan pressure ratio” is the pressure ratio across the fan blade 43 alone, without a Fan Exit Guide Vane (“FEGV”) system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. “Corrected fan tip speed” is the actual fan tip speed in ft/sec divided by an industry standard temperature correction of $[(\text{Tram}°\text{R})/(518.7°\text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

The bearing systems 38 may be associated with respective bearing compartments. A seal may be biased with one or more springs to seal a periphery of the bearing compartment. Various seals may be utilized, such as a carbon seal. The seal may be carried by a seal carrier, which may be secured to a static housing. The bearing system 38 may be dimensioned to provide sufficient axial space within the bearing compartment to allow for an appropriate spring length between the seal carrier and the static housing. The length may be selected to ensure a consistent spring load throughout the engine operating range including wear or degradation of components. A spring may be selected to have a relatively light spring load, which may minimize or otherwise reduce heat generation at the seal interface. In implementations, the axial space within the bearing compartment may be reduced.

The techniques disclosed herein may be utilized to maintain a suitable spring operating length.

The disclosed techniques may incorporate one or more spring carriers. The spring carriers may have a cup-shaped profile and may be integrally formed or otherwise fixedly attached to a seal carrier. The spring carriers may be dimensioned to achieve a sufficient operating spring length. The spring carriers may be arranged to avoid or otherwise reduce interfering with mating hardware or impacting egress of lubricant from the seal seat. The depth of pockets in the spring carries may be selected based upon the available space, spring load and overall spring operating length characteristics. The spring carriers may extend in a direction of a protrusion (e.g., nose) of the seal that establishes a sealing relationship with an adjacent seal land.

Figure 2:
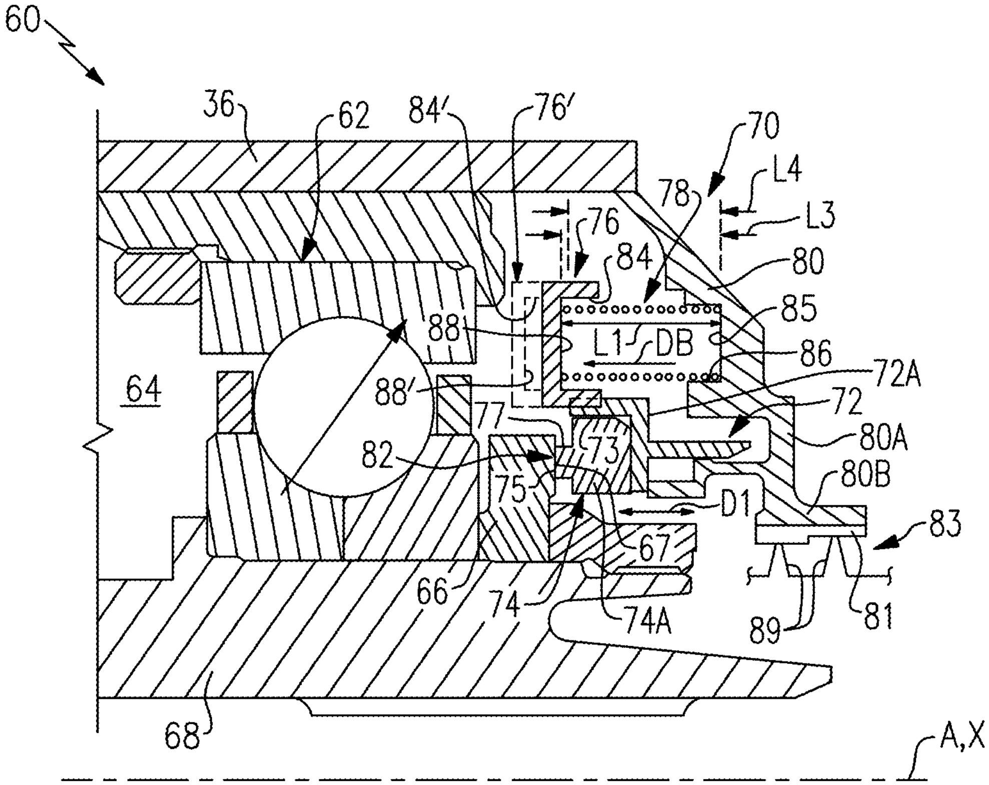
FIG. 2 discloses a seal assembly adjacent to a bearing compartment.

Referring to FIG. 2, with continuing reference to FIG. 1, a bearing assembly 60 is disclosed. The bearing assembly 60 may be incorporated into a gas turbine engine, such as one of the bearing systems 38. The bearing assembly 60 may include at least one bearing 62. A carrier of the bearing 62 may be secured to a portion of the engine static structure 36, such as a housing. The bearing 62 may be positioned in a bearing compartment 64. The bearing compartment 64 may be adapted to receive lubricant to lubricate the bearing 62 and/or provide cooling augmentation during operation.

The bearing assembly 60 may include at least rotatable member 66. The rotatable member 66 may be an annular ring (e.g., plate). The rotatable member 66 may be coupled to or integrally formed with another rotatable component such as a rotatable shaft 68. The shaft 68 may be one of the shafts of the engine 20, such as the shafts 40, 50. The shaft 68 may interconnect a compressor and a turbine that may drive the compressor, such as one of the turbines 46 and/or 54. The bearing 62 may support the shaft 68. The rotatable member 66 may include an axially facing seal land 67 for establishing a sealing relationship along a periphery of the bearing compartment 64.

FIG. 2 discloses a seal assembly 70 for a gas turbine engine, such as the gas turbine engine 20 of FIG. 1. The seal assembly 70 may be adapted to seal one or more portions of a gas turbine engine, such as the engine 20. In the implementation of FIG. 2, the seal assembly 70 may be adapted to seal a portion (e.g., perimeter) of the bearing compartment 64. The seal assembly 70 may include a seal carrier 72, a seal member 74, one or more spring carriers (e.g., cups) 76, and/or one or more spring members (e.g., springs) 78, which may be arranged relative to an assembly axis X. The assembly axis X may be colinear with or otherwise parallel to the engine axis A.

The seal carrier 72 may be securable to a support 80. The support 80 may be mechanically attached or otherwise secured to the engine static structure 36. The support 80 may include a support body 80A dimensioned to extend along the assembly axis X. The support body 80A may have an annular geometry that may be dimensioned to extend about the assembly axis X. A carrier body 72A of the seal carrier 72 may have an annular geometry that may be dimensioned to extend about the assembly axis X. The support 80 may include a flange 80B extending from the support body 80A. The flange 80B may include an (e.g., abradable) seal land 81. The seal land 81 may be adapted to engage or otherwise cooperate with one or more adjacent seal structures (e.g., knife edges) 89 to establish a sealing relationship 83.

The seal member 74 may be fixedly attached or otherwise secured to the seal carrier 72. The seal member 74 may be carried by the seal carrier 72. The seal member 74 may serve to seal the bearing compartment 64 and minimize or otherwise reduce leakage of lubricant from the compartment 64. The materials of the seal carrier 72 and seal member 74 may be the same or may differ from each other. The seal member 74 may incorporate one or more non-metallic materials, such as a (e.g., monolithic) carbon. The seal member 74 may be an annular carbon seal. The seal member 74 may include a seal body 74A having an annular geometry dimensioned to extend about the assembly axis X. The seal body 74A may be a full hoop dimensioned to extend about the assembly axis X. The seal member 74 may be securable along a shelf 73 of the seal carrier 72. The shelf 73 may be dimensioned to extend about a periphery (e.g., outer diameter) of the seal member 74.

The seal member 74 may be a contacting-type seal. The seal member 74 may include an (e.g., annular) seal face 75. The seal face 75 may be established along an annular protrusion (e.g., nose) 77 of the seal member 74. The protrusion 77 may extend outwardly (e.g., axially) from the seal body 74A. The seal face 75 may be dimensioned to engage the seal land 67 at an interface 82 to establish a sealing relationship. In implementations, the seal land 67 and interface 82 may be associated with a bearing compartment, such as bearing compartment 64.

The seal assembly 70 may include a plurality of the spring carriers 76 and/or a spring member(s) 78, which may be distributed about the assembly axis X. The spring carriers 76 and/or spring members 78 may be positioned in, or may be otherwise adjacent to, the bearing compartment 64. Each spring carrier 76 may extend from the seal carrier 72. One or more, or all, of the spring carriers 76 may extend (e.g., axially) from the seal carrier 72 relative to the assembly axis X. Each spring carrier 76 may be fixedly attached or otherwise secured to the seal carrier 72. The spring carrier(s) 76 may be separate component(s) fixedly attached or otherwise secured to the seal carrier 72. In other implementations, the spring carrier 76 may be integrally formed with the seal carrier 72. Various techniques may be utilized to secure the spring carrier 76 to the seal carrier 72, such as welding, press fitting, threading, riveting or mechanically attaching with one or more fasteners.

The seal carrier 72 and spring carrier(s) 76 may include various materials. The seal carrier 72 and spring carrier(s) 76 may include non-metallic and/or metallic materials, including any of the materials disclosed herein. The seal carrier 72 and spring carrier(s) 76 may include the same material(s) and/or different material(s). Various metallic materials may be utilized, such as a high-temperature metal or alloy. Various non-metallic materials may be utilized, such as a (e.g., monolithic) ceramic. In implementations, the seal carrier 72 and spring carrier(s) 76 may be integrally formed. The spring carrier(s) 76 may be machined into the seal carrier 72.

The seal carrier 72 may be movable in a first direction D1 relative to the support 80. The first direction D1 may be substantially parallel to the assembly axis X. Each spring member 78 may be arranged to bias the seal face 75 of the seal member 74 in a direction DB against the seal land 67 at the interface 82 to establish a sealing relationship. The direction DB may be substantially parallel to the first direction D1 and/or the assembly axis X. Various spring members may be utilized, such as a coil spring or wave spring. The spring member 78 may have a spring force sufficient to bias the seal member 74 against the seal land 67.

The spring carrier 76 may have various geometries. In implementations, the spring carrier 76 may be cup-shaped. Each spring carrier 76 may include a respective spring pocket 84. The spring carrier 76 and/or respective spring pocket 84 may be substantially cylindrical. For purposes of this disclosure, the term "substantially" means ±10 percent of the stated value or relationship unless otherwise indicated. The spring pocket 84 may be dimensioned to at least partially receive a respective spring member 78. In other implementations, the spring carrier 76 may have an annular geometry dimensioned to extend about the assembly axis A and may include two or more spring pockets 84.

The spring member(s) 78 may be captured between the respective spring carrier(s) 76 and a spring land 85 of the support 80. The spring member(s) 78 may be captured between the respective spring carrier(s) 76 and the spring land(s) 85 of the support 80 such that the spring carrier 76 may be biased away from the support 80 in an assembled configuration. The spring member(s) 78 may be received in the spring pocket(s) 84 of the respective spring carrier(s) 76 and may be seated against the support 80. The spring member 78 may be dimensioned to abut a floor 88 of the respective spring pocket 84. The support 80 may include one or more retention pockets 86. The retention pockets 86 may establish respective spring lands 85. Each spring member 78 may be received in the spring pocket 84 of a respective one of the spring carriers 76 and/or a respective retention pocket 86. Each spring pocket 84 may be substantially circumferentially and/or radially aligned with a respective one of the retention pockets 86 in the assembled configuration relative to the assembly axis X.

The seal assembly 70 may be dimensioned to establish a relatively compact arrangement. The spring member(s) 78 may be dimensioned to bias the respective spring carrier(s) 78 and/or seal carrier 72 away from the support 80. In implementations, the spring carrier 76 may overhang and/or extend axially past the seal land 67 relative to the assembly axis X. The spring member(s) 75 may be dimensioned to bias the seal member 74 against the seal land 67 at the interface 82 such that the spring carrier(s) 76 may extend axially past the interface 82 relative to the assembly axis X. Each of the spring carriers 76 may be radially outward of the seal member 74 relative to the assembly axis X. The spring pockets 84 may be dimensioned such that the spring member 78 may extend axially past the seal face 75 relative to the assembly axis X. The techniques disclosed herein may facilitate incorporating a relatively longer spring member 78 into the seal assembly 70 while maintaining a reduced axial distance between the seal face 75 and the support 80.

Various techniques may be utilized to establish the compact arrangement. The spring carrier(s) 76 may be dimensioned to overhang the seal member 74, including the protrusion 77 and/or the seal face 75 associated with the interface 82. The spring member 78 may extend a first (e.g., assembled) length L1 in a compressed state between the respective floor 88 and spring land 85 in the assembled configuration. The spring member 78 in the compressed state may include a sufficient amount of compression (e.g., closing force) to maintain contact between the seal face 75 and the seal land 67. The spring member 78 may extend a second (e.g., free state) length L2 in a fully uncompressed state (e.g., FIG. 4). In implementations, the first length L1 may be at least 70%, or more narrowly at least 80%, of the second length L2.

The spring member 78 may have various dimensions. In implementations, the first length L1 may be approximately 0.6 inches to approximately 1.4 inches. The second length L2 may be approximately 0.8 inches to approximately 1.8 inches. A diameter of the spring member 78 may be approximately 0.3 inches to approximately 0.6 inches. In implementations, approximately 0.0 inches to approximately 0.3 inches or more of the spring member 78 may overhang the protrusion 77 of the seal member 74.

A maximum distance between the seal face 75 (or the interface 82) and the spring land 85 of the support 80 in the assembled configuration may establish a third length L3 relative to the assembly axis X. A maximum distance between the floor 88 of the spring pocket 84 and the spring land 85 of the support 80 in the assembled configuration may establish a fourth length L4 relative to the assembly axis X. The fourth length L4 may be established based on a specified spring length and/or to achieve a relatively light spring load. In implementations, the fourth length L4 may be at least 95% or more of the third length L3. In further implementations, the fourth length L4 may be greater than the third length L3 such that a floor 88' of a spring pocket 84' may extend axially past the seal face 75 relative to the assembly axis X (floor 84' shown in dashed lines).

Figure 3:
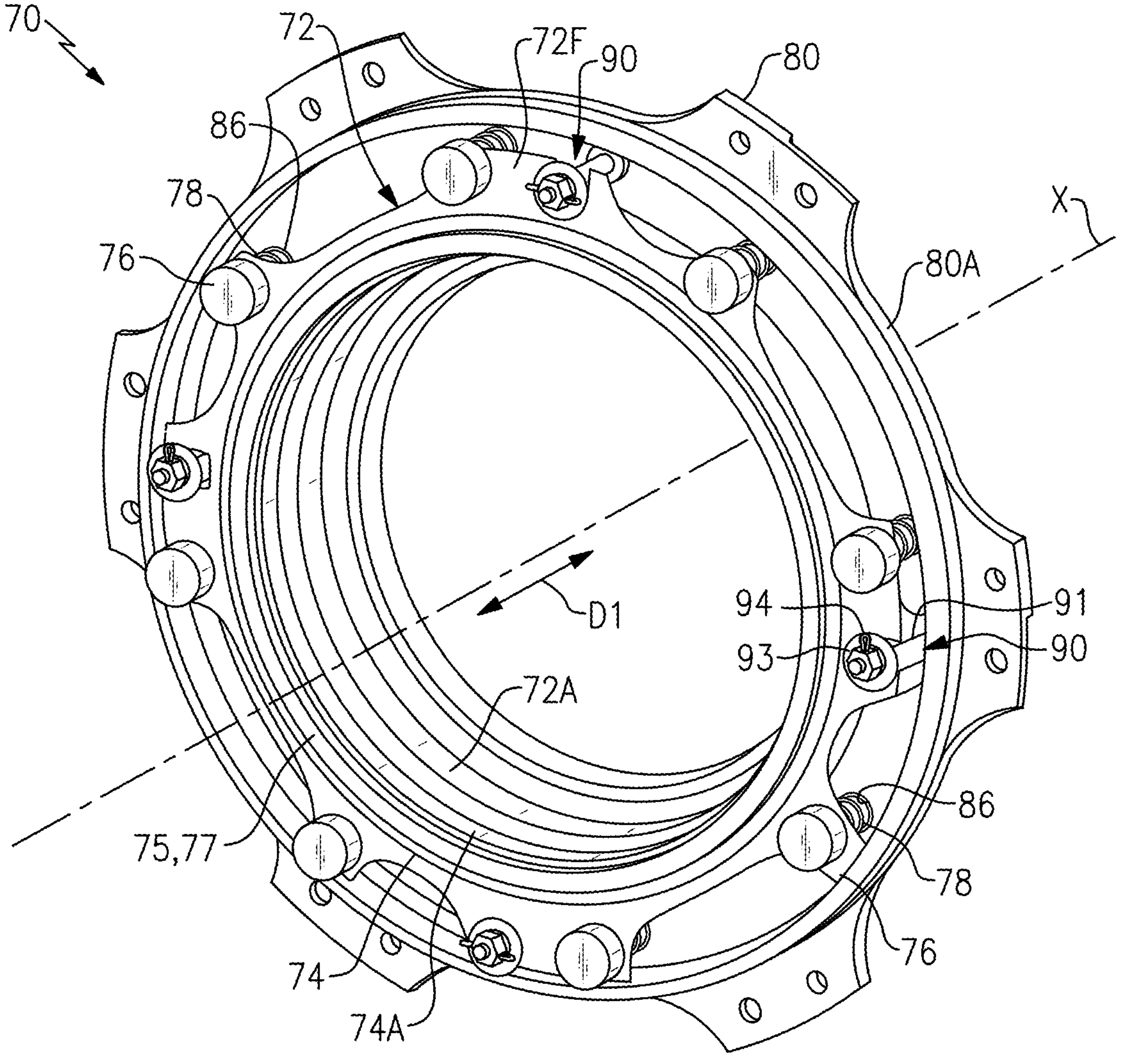
FIG. 3 discloses a perspective view of the seal assembly of FIG. 2.
Figure 4:
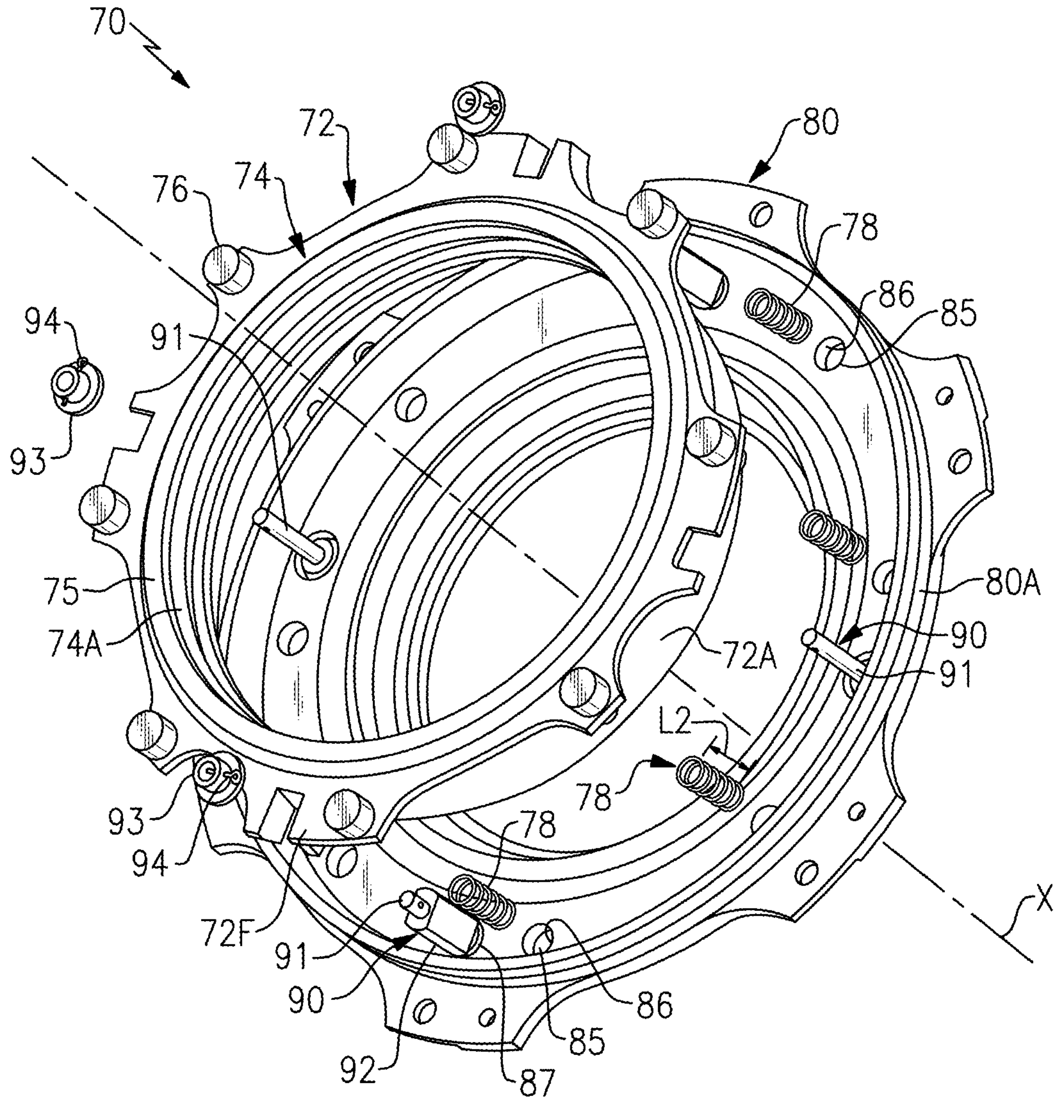
FIG. 4 discloses an exploded view of the seal assembly of FIG. 3.

Referring to FIGS. 3 and 4, with continuing reference to FIG. 2, the seal assembly 70 is shown in assembled and disassembled configurations, respectively. The seal carrier 72 and support 80 may be secured to each other utilizing various techniques such as one or more fasteners 90. The fasteners 90 may be interspersed with the spring carriers 76 relative to the assembly axis X. Various fasteners may be utilized. Each fastener 90 may include an elongated guide (e.g., pin or bolt) 91, an elongated spacer 92 (FIG. 4), a retainer (e.g., washer) 93 and/or a retention member (e.g., pin) 94. A portion of the guide 91 may be received in a respective pocket 87 of the support 80 (FIG. 4). The spacer 92 may be dimensioned to establish a minimum (e.g., axial) distance between the seal member 74 and support 80. The retainer 93 may be dimensioned to abut a flange 72F or another portion of the seal carrier 72. The retainer 93 may be secured to the guide 91 to establish a maximum axial distance between the seal member 74 and support 80. The maximum axial distance may be greater than or equal to the first length L1, but may be equal to or less than the second length L2 of the spring member 78. The maximum axial distance may be set such that the spring member 78 may be decompressible to maintain contact between the seal face 75 and the seal land 67.

Figure 5:
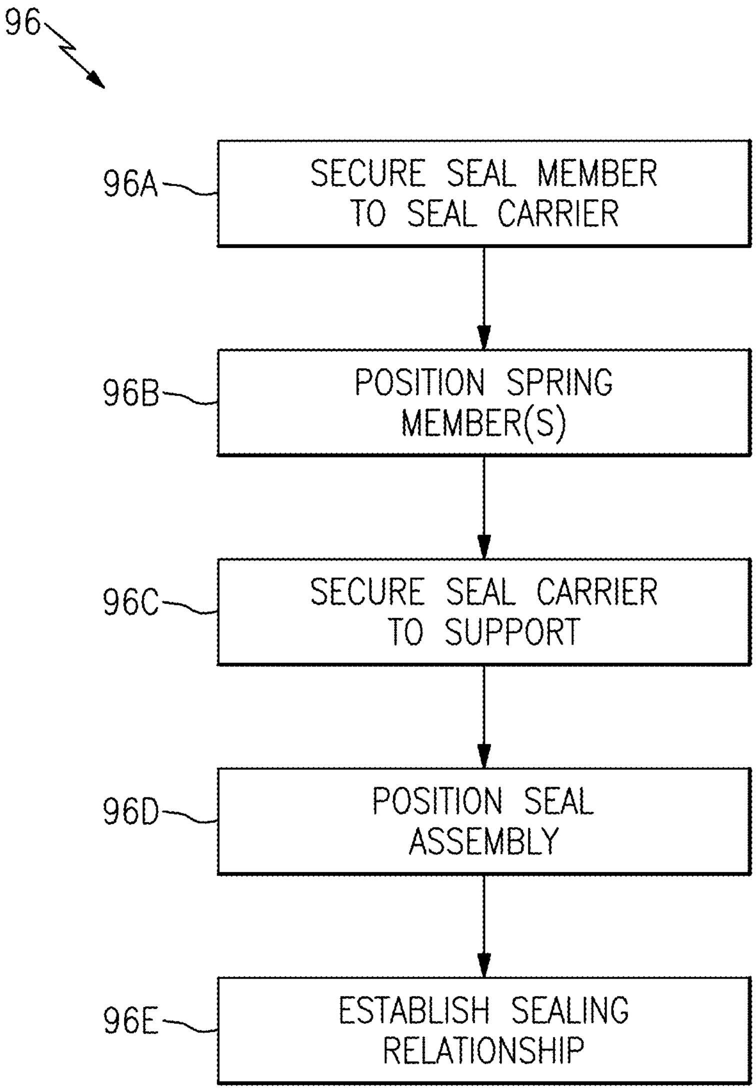
FIG. 5 discloses a method of sealing a component.

Referring to FIG. 5, with continuing reference to FIGS. 2 and 3, a method for sealing a gas turbine engine is disclosed in a flow chart 96 according to an implementation. The method 96 may be utilized to seal adjacent components, including adjacent components of a gas turbine engine such as a bearing compartment. Fewer or additional steps than are recited below could be performed within the scope of this disclosure, and the recited order of steps is not intended to limit this disclosure. Reference is made to the seal assembly 70 of FIGS. 2-4.

At block 96A, an (e.g. contacting-type) seal member 74 may be secured to a seal carrier 72. The seal member 74 may include non-metallic and/or metallic materials, including any of the materials disclosed herein. In implementations, the seal member 74 may be a carbon seal.

At block 96B, one or more spring members 78 may be positioned relative to the seal carrier 72. The spring members 78 may be dimensioned according to any of the techniques disclosed herein. In implementations, each of the spring members 78 may be positioned between the support 80 and a respective spring carrier 76. The spring carrier(s) 76 may be fixedly attached or otherwise secured to the seal carrier 72. The spring carrier(s) 76 may extend from the seal carrier 72. The seal carrier 72 and spring carrier(s) 76 may include non-metallic and/or metallic materials, including any of the materials disclosed herein.

At block 96C, the seal carrier 72 may be secured to the support 80 (e.g., FIG. 3). The seal carrier 72 and support 80 may be arranged to establish any of the dimensional relationships disclosed herein. The spring members 78 may be arranged according to any of the techniques disclosed herein. The seal carrier 72 may be secured to the support 80 such that one or more of the spring members 78 may be captured in a respective spring pocket 84 of the spring carrier 76 and/or a respective retention pocket 86 of the support 80.

At block 96D, the seal assembly 70 may be positioned relative to an adjacent component or sub-assembly. The components of the seal assembly 70 may be secured to together such that the seal assembly 70 may be positioned in the engine 20 as a unit, which may reduce assembly time and complexity. Block 96D may include moving the seal assembly 70 along the engine axis A (FIG. 2). The support 80 may be fixedly attached or otherwise secured to a portion of the engine static structure 36.

At block 96E, a sealing relationship may be established. Block 96E may include biasing the seal member 74 against the rotatable seal land 67 at the interface 82 such that one or more of the spring carriers 76 may overhang and/or extend past the interface 82 relative to the assembly axis X and/or engine axis A. In implementations, the interface 82 may be established along the bearing compartment 64.

The disclosed systems and methods may be utilized establish a seal assembly having suitable sealing characteristics and that may achieve an overall engine system length reduction.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
a seal carrier extending about an assembly axis;
a contacting-type seal member along the seal carrier;
at least one spring carrier coupled to the seal carrier;
at least one spring member received in a spring pocket of the respective at least one spring carrier, wherein the at least one spring member abuts a floor of the spring pocket, and wherein the at least one spring member is arranged to bias a seal face of the contacting-type seal member against a seal land at an interface; and
a support extending about the assembly axis;
wherein a portion of the at least one spring carrier extends past the seal face relative to the assembly axis;
wherein the at least one spring member is captured between the respective at least one spring carrier and a spring land of the support; and
wherein the floor of the spring pocket is moveable between a first position on a first side of the seal land and a second position on a second side of the seal land in response to biasing of the spring carrier by the spring member away from the support.

2. The seal assembly as recited in claim 1, wherein:
the at least one spring carrier includes a plurality of spring carriers distributed about the assembly axis; and
the at least one spring member includes a plurality of spring members received in the spring pockets of the respective spring carriers.

3. The seal assembly as recited in claim 1, wherein the at least one spring carrier is radially outward of the contacting-type seal member relative to the assembly axis.

4. The seal assembly as recited in claim 3, wherein the spring pocket is dimensioned such that the at least one spring member extends past the seal face relative to the assembly axis.

5. The seal assembly as recited in claim 1, wherein the contacting-type seal member is non-metallic.

6. The seal assembly as recited in claim 5, wherein the contacting-type seal member is a carbon seal.

7. The seal assembly as recited in claim 1, wherein the at least one spring carrier and the respective spring pocket are cylindrical.

8. The seal assembly as recited in claim 1, wherein the at least one spring member is a coil spring.

9. The seal assembly as recited in claim 1, wherein the seal land is axially facing relative to the assembly axis.

10. The seal assembly as recited in claim 1, wherein the seal land is associated with a bearing compartment.

11. The seal assembly as recited in claim 10, wherein the bearing compartment includes a bearing that supports a rotatable shaft.

12. A gas turbine engine comprising:
a compressor section including a compressor;
a turbine section including a turbine that drives the compressor; and
a seal assembly comprising:
a seal carrier secured to a support;
at least one spring carrier extending from the seal carrier along an engine axis;
a seal member secured to the seal carrier; and
at least one spring member received in a spring pocket of the respective at least one spring carrier and seated against the support, wherein the at least one spring member abuts a floor of the spring pocket;
wherein the at least one spring member is arranged to bias the seal member against a seal land at an interface such that the at least one spring carrier extends past the interface relative to the engine axis; and
wherein the floor of the spring pocket is moveable between a first position on a first side of the seal land and a second position on a second side of the seal land in response to biasing of the spring carrier by the spring member away from the support.

13. The gas turbine engine as recited in claim 12, wherein the seal member is non-metallic.

14. The gas turbine engine as recited in claim 13, wherein the seal member is a carbon seal extending about the engine axis.

15. The gas turbine engine as recited in claim 12, further comprising:

a bearing assembly including at least one bearing in a bearing compartment and a rotatable member establishing the seal land.

16. The gas turbine engine as recited in claim 12, wherein the support is fixed to a static structure of the engine.

17. The gas turbine engine as recited in claim 12, wherein:

the at least one spring carrier includes a plurality of spring carriers distributed about the engine axis; and the at least one spring member includes a plurality of spring members received in the spring pockets of the respective spring carriers.

18. A method of sealing for a gas turbine engine comprising:

securing a seal carrier to a support such that one or more spring members are captured in one or more respective pockets of one or more spring carriers that extend from the seal carrier, wherein the one or more spring members abut a floor of the respective one or more spring pockets;

securing a contacting-type seal member to the seal carrier; and biasing the contacting-type seal member against a rotatable seal land at an interface such that the one or more spring carriers extend past the interface relative to an engine axis;

wherein the floor of the one or more spring pockets is moveable between a first position on a first side of the seal land and a second position on a second side of the seal land in response to the biasing.

19. The method as recited in claim 18, wherein the contacting-type seal member comprises a carbon material.

20. The method as recited in claim 18, wherein:

the interface is established along a bearing compartment; and the bearing compartment includes at least one bearing that supports a rotatable shaft.

* * * * *